United States Patent [19]
Lazarchik et al.

[11] 3,921,169
[45] Nov. 18, 1975

[54] MULTIPLE MODE RADIOMETRIC SYSTEM WITH RANGE DETECTION CAPABILITY

[75] Inventors: Robert E. Lazarchik, Largo; Robert S. Roeder, Dunedin; Donald R. Runkle, Palm Harbor, all of Fla.

[73] Assignee: Sperry Rand Corporation, New York, N.Y.

[22] Filed: July 18, 1974

[21] Appl. No.: 489,668

[52] U.S. Cl. .............. 343/5 R; 343/7.5; 343/14; 343/100 ME
[51] Int. Cl.² ................................. G01S 9/26
[58] Field of Search ........ 343/100 ME, 5 R, 7.5, 14

[56] References Cited
UNITED STATES PATENTS 3,212,083  10/1965  Hinchman ........................ 343/7 A
3,380,055  4/1968  Fow et al. ...................... 343/100 ME Primary Examiner—Maynard R. Wilbur
Assistant Examiner—Richard E. Berger
Attorney, Agent, or Firm—Howard P. Terry

[57] ABSTRACT

An improved microwave radiometric system features operation selectively in passive or active modes, providing in the active mode incoherent frequency modulated continuous wave illumination of a selected target for improving the measured radiometric temperature contrast between the target and its spatial background and for increasing the distance at which such a target may be detected. Composite noise and triangular wave frequency modulation elements in a closed-loop control system yield a constant receiver beat frequency in a system in which range data is derived.

10 Claims, 8 Drawing Figures

MULTIPLE MODE RADIOMETRIC SYSTEM WITH RANGE DETECTION CAPABILITY

BACKGROUND OF THE INVENTION

1. Field of the Invention

The invention pertains to the art of high frequency radiometry using comparison of the amplitude of a signal to be investigated, such as a thermal or other noise signal, with the amplitude of a locally generated noise reference signal. In such radiometer receivers, an amplitude detector is connected alternately and cyclically to noise receiver elements and then to a local reference noise signal generator. The invention more particularly relates to such a radiometric system in which a composite noise and triangular wave frequency modulation is provided for the high frequency signal illuminating the selected target through a single antenna, augmenting the apparent temperature of the selected target with respect to its spatial background and providing a closed loop control system for extracting target range data.

2. Description of the Prior Art

The comparison radiometer receiver has been widely used for the study of relatively low-level noise-like radio frequency signals, especially where the amplitudes of the noise signals to be examined are small in comparison to the internally generated noise level within the radiometer receiver. Comparison radiometer systems achieve substantial cancellation of the receiver background noise and self-noise, permitting relatively accurate measurements of low-level radio frequency signals.

While there are other types of comparison radiometers, one type of radiometer particularly used in the high frequency or microwave bands is that in which a version of an incoming signal to be investigated and a standard or calibrated reference noise signal are compared in amplitude. The method employed consists essentially of the comparison of the unknown noise signal amplitude coming from the source to be examined with a known amplitude noise signal from a calibrated source; the method can be used to measure the effective temperature of an unknown source with considerable accuracy. In such instruments, the input to receiver elements is switched between the unknown signal and the local noise reference generator signal at a relatively high rate, and the detected and amplified receiver output is coupled to a phase sensing detector operated in synchronism with the switching rate. The final unidirectional output signal is proportional to the difference between the temperature of the noise reference signal source and the temperature of the source viewed by the radiometer antenna, since the phase sensing detector acts automatically to subtract the receiver background or internal noise.

Passive radiometric systems, including those of the above described kind, have distinct advantages in that they are passive and therefore do not interfere with the operation of other radio equipment; they also operate with utility in most types of weather, are simple and reliable, and are relatively inexpensive. The performance of early prior art radiometric systems with respect to targets at relatively great ranges has been less than fully satisfactory because of the limited basic radiometric temperature contrast between such selected targets at their spatial background. Furthermore, there is a significantly increasing dilution effect at large target distances because of the constant angular width receptivity pattern of the directive antennas normally employed in radiometer systems.

In more recent radiometric systems, facilities have been added for providing means for detecting targets at relatively greater distances and for accurately performing illuminated or active radiometric measurements thereupon. In such systems, signals such as target signals to be investigated are again received by a suitable antenna and are compared with reference signals provided by a reference signal generator. Normally, the signals being compared are broad band or white noise signals. A switching device cyclically and repeatedly applies the received and reference signals within the intermediate frequency section of the radiometer receiver. The output of the detector of the radiometer receiver is an alternating signal having a strong component at the same frequency as that at which the switch is operated. The alternating component is applied through a suitable amplifier to a phase sensitive detector, thence to a signal integrator circuit and may operate a display calibrated in terms of temperature.

Such radiometer equipment may be operated in a generally conventional manner as in a passive radiometric system or may be used in a second mode providing transmission of noise signals for illumination of a remote target. The broad band noise power is continuously transmitted, being directed by the radiometer's single antenna to the selected target. The transmitter and receiver elements cooperate with the single directive antenna, the high frequency portion of the radiometer system being supplied with a novel signal generation and isolation system for permitting continuous wave transmission when the system is operated in its active mode. Such systems overcome certain fundamental defects in prior art comparison radiometers; i.e., the limited temperature contrast of the usual target with respect to its spatial background is circumvented, as well as the aforementioned dilution effect characteristic of conventional radiometric antennas. However, there has not been advanced a system additionally lending target range measurement capability to such prior art radiometric systems in a manner fully compatible with their established designs and in such a way that the particularly beneficial features of those designs are not compromised or even seriously degraded. It is desired to make maximum use of common components of the existing active-passive system, to use a single antenna aperture, and to use a single high frequency oscillator both as transmitter and receiver local oscillator. It is additionally desired to retain in active mode operation the beneficial measurement features provided for use in the passive mode of operation.

SUMMARY OF THE INVENTION

The present invention is an improved radiometric system providing means for detecting targets at relatively great distances and for accurately performing active illuminated or passive radiometric measurements thereupon, including target range measurements when operating in the active mode. The improved microwave radiometric system features operation selectively in passive or active modes, providing in the active mode incoherent f.m. continuous wave illumination of a selected target for improving the measured radiometric temperature contrast between the target and its spatial background and also for increasing the distance at which such a target may be detected. Composite noise and triangular wave frequency modulation elements in a closed-loop control system yield a constant receiver beat frequency in a sensor system in which range data is derived.

The invention more particularly relates to such a radiometric system in which a composite noise and triangular wave frequency modulation is provided for the high frequency signal illuminating the selected target through a single antenna, thus augmenting the apparent temperature of the selected target with respect to its spatial background and providing a closed loop control system for extracting target range data.

DESCRIPTION OF THE PREFERRED EMBODIMENTS

Figure 1:
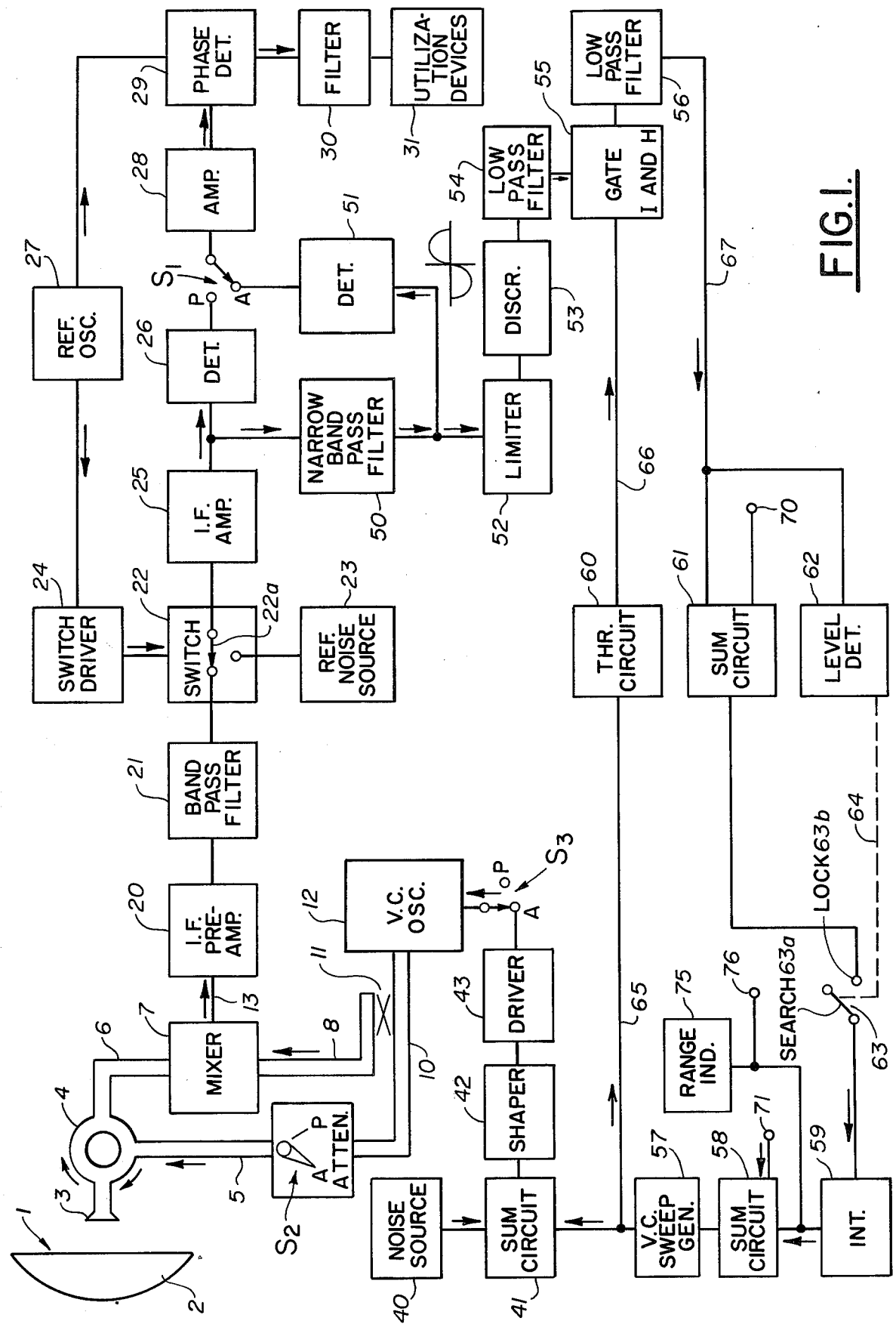
FIG. 1 is a block diagram of the novel radiometer system showing its components and their electrical interconnections.

In the present invention, a radiometric system adaptable to use in several applications is illustrated. Therefore, it will be understood that the antenna 1, illustrated in FIG. 1 as including a collimating lens 2 cooperating with an electromagnetic horn 3, represents only one of several possible antenna configurations which may advantageously be employed with the invention. Though other types of antennas may be used, such as gimbal mounted tracking or searching antennas or simple directive antennas affixed to the fuselage of a manually or automatically steerable craft, the invention is shown for purposes of illustration as utilizing a microwave lens collimator 2 having a cooperating horn 3 connected to a wave guiding transmission line system. The electromagnetic horn 3 may be scanned for conically scanning of a directive radiation pattern about the antenna bore sight axis. Such conical scan operation may be effected in the conventional manner or as further described in Lazarchik et al U.S. Pat. No. 3,787,857 for a "Dual Mode Radiometric System", issued Jan. 22, 1974, and assigned to the Sperry Rand Corporation. As in the Lazarchik et al. patent, the conical scanning of the radiation pattern may be used for developing directional error signals for use in guiding a craft. Antenna 1 may additionally or alternatively be moved about a normally horizontal axis under manual or automatic control and about a vertical axis in a similar manner as also discussed in the aforementioned Lazarchik et al patent.

The directive horn 3 is coupled to one port of the conventional multi-port transmission line circulator 4; a second port of circulator 4 is coupled by transmission line 6 to a first port of a conventional high frequency, low noise mixer 7, while a third port of circulator 4 is coupled through the dual-state attenuator 9 and transmission line 10 to the voltage-controlled local oscillator 12. Oscillator 12, when the system is operating, continuously supplies local oscillator energy throughh directional coupler 11 and transmission line 8 to a second port of mixer 7. The output of local oscillator 12 has a constant high frequency during mode P by virtue of the constant voltage applied to oscillator 12 by a power supply (not shown) coupled to terminal P of switch $S_3$.

Any output of the low noise balanced mixer 7 supplied on conductor 13 is suitable for amplification by a conventional intermediate frequency amplifier 20, after which it is passed through wide band pass filter 21 to switch 22. Filter 21 acts to suppress low intermediate frequency signals which may occur due to leakage of circulator 4 and reflection of high frequency power in antenna 1. Switch 22 may be a switch of known type having one of two possible conditions both under the control of the switch driver 24 as synchronized by a conventional reference oscillator 27. In the instantaneous condition shown in the drawing for the actual switching element 22a, the output of band pass filter 21 is passed to a second intermediate frequency amplifier 25, which may be a gain controlled amplifier and has substantially the same pass band and center frequency as amplifier 20.

Switch 22 is operated cyclically, being moved regularly in synchronism with the output of the conventional reference oscillator 27. When residing on the second terminal of switch 22, switch element 22a connects the conventional intermediate frequency noise source 23 to amplifier 25.

When the radiometer system is operated in the passive mode P, the ganged switches $S_1$, $S_2$, and $S_3$ are moved away from the illustrated position A to the position marked P. Thus, the output of intermediate frequency amplifier 25 is then coupled to the square law envelope detector 26. After further amplification, if required, by amplifier 28, the detected envelope signal is coupled to one input of a conventional audio phase detector 29 to a second input of which is coupled a phase reference signal from reference oscillator 27. It is to be noted that the output of the phase reference oscillator 27 is supplied both to the second input of phase detector 29 and also for exciting switch driver 24 for the purpose of cyclically operating switch 22. The output of phase detector 29 is passed through the conventional filter 30, if required, to utilization equipment 31. The utilization devices 31 may include the guidance display or control elements of the Lazarchik et al. patent, for example, or other utilization equipment known in the prior radiometric art.

It will be understood that the portion of the system used in the passive mode of operation is substantially like apparatus normally used in passive radiometric systems known in the art. In this mode, energy from local oscillator 12 is applied through directional coupler 11 to mixer 7, an insignificant amount of oscillator energy being passed through attenuator 9 and radiated by antenna 1. In this case, attenuator $S_1$ is set at its mode P location, where it has a maximum attenuating effect.

In the radiometer system of the aforementioned Lazarchik et al patent, the passive mode of operation is provided, along with a second or active mode A providing continuous transmission of energy for illumination of a remote target under examination. The energy thus transmitted improves the measured radiometric temperature contrast between the target and its spatial background for increasing the distance at which such a target may first be detected. In the present invention, improved detectability is retained through the use of a similar arrangement additionally providing measurement of distance to the irradiated target.

In the novel active mode A of operation of the system, switches $S_1$, $S_2$, and $S_3$, are in the mode A conditions illustrated in FIG. 1. In this situation, the attenuator 9 is set to its A setting or minimum attenuation condition, detector 26 is bypassed, and the voltage-controlled oscillator 12 no longer is controlled by a constant voltage. Amplifier 28 is fed through the alternative path including narrow band pass filter 50 and detector 51. To the voltage-controlled oscillator 12 is fed a shaped cyclic modulating wave via driver 43.

Accordingly, high frequency energy from the voltage-controlled frequency-modulated oscillator 12 provides a transmitted signal through attenuator 9, as well as local oscillator power to mixer 7. The signal flowing through attenuator 9 is radiated by antenna 1 because of the action of the circulator 4 in isolating the transmitted signal from mixer 7. For a similar reason, circulator 4 couples any received energy to the balanced mixer 7.

In the active mode, with switch $S_1$ in the position shown in FIG. 1, oscillator 12 is frequency modulated by a composite triangular and noise signal. For this purpose, the output of a conventional voltage-controlled triangular sweep wave generator 57 is added in sum circuit 41 to a Gaussian noise signal generated by noise source 40. Before the output of sum circuit 41 is used, it is passed through shaper circuit 42 to make linear the high frequency deviation of the signal in a conventional manner and the shaped wave is then applied to the oscillator driver 43.

Figure 2:
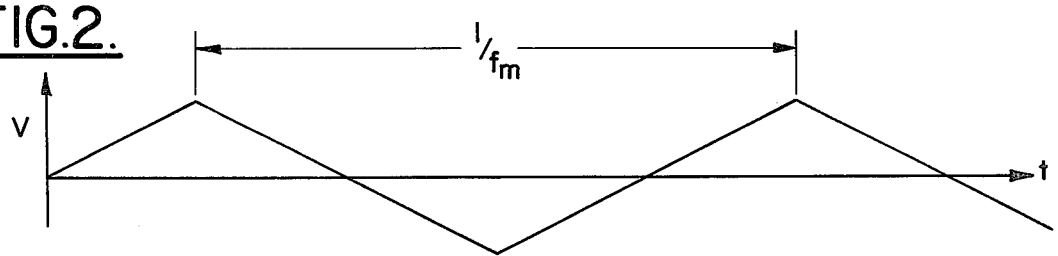
FIGS. 2 through 8 are wave form graphs useful in explaining the operation of the invention.
Figure 4:
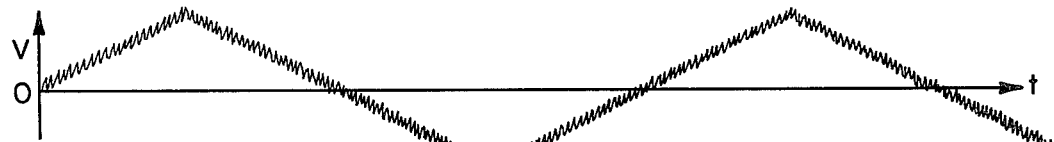
Figure 5:
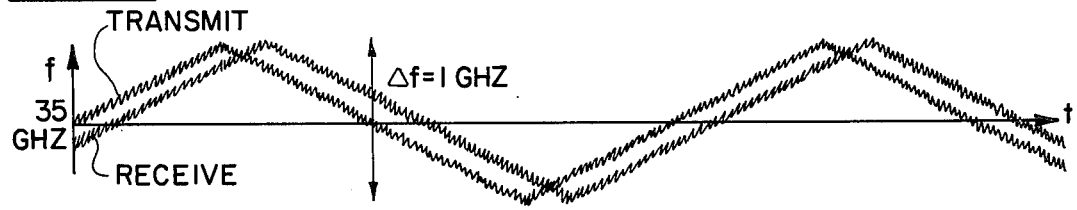
Figure 6:
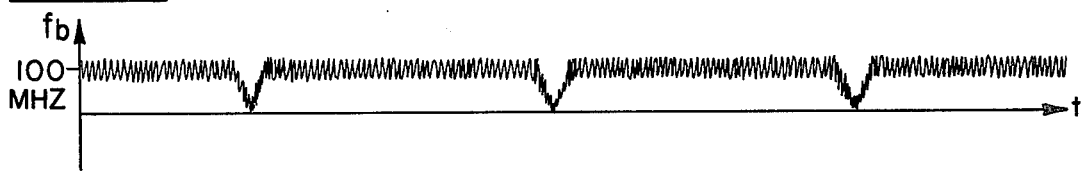

The modulation applied to oscillator 12 is in part the linear triangular wave of FIG. 2; when summed with the Gaussian noise output of noise source 40, the wave of FIG. 4 results. After the triangular wave is shaped and supplied to oscillator 12, the consequent high frequency transmitted and received waves have the noise modulated appearance of the indicated waves of FIG. 5. Because the received signal is delayed in time with respect to the transmitted signal at the input to mixer 7, a beat frequency which is the difference between the transmitted and received frequencies is generated. This frequency is proportional to the time delay or to the range of the illuminated reflecting target and appears at the output of mixer 7. For a typical difference frequency of 100 MHz., for example, the beat frequency wave form is represented in FIG. 6. This repetitive signal is amplified and passed through band pass filter 21, to switch 22.

Still with particular reference to the active mode operation of the radiometric system, the filtered intermediate frequency signal is supplied to the radiometer switch 22, which also acts as in passive mode operation alternately to sample the intermediate frequency signal and an intermediate reference noise signal from source 24, thus producing an amplitude modulated intermediate frequency signal. Before operation, the reference level of the intermediate frequency noise signal is normally adjusted to equal the level of the noise appearing in the received signal channel.

In the active mode, the output of radiometer switch 22, after amplification, is fed through narrow band pass filter 50 prior to detection of its envelope by detector 51. Filter 50, which establishes the effective front end band width of the receiver, may have a pass band nominally 50 MHz. wide centered at 100 MHz., for example. After being detected, the signal is amplified and processed in the same apparatus and in the same manner with respect to utilization devices 31 as for passive mode operation.

A desirable effective reduction in intermediate frequency band width in mode A is made possible according to the invention by holding the beat frequency constant. Thus, the frequency of modulation is controlled in a closed loop servo in such a manner that the beat frequency is a constant independent of target range. For this purpose, the output of narrow band pass filter 50 is limited and amplified by circuit 52 prior to being fed to a conventional frequency discriminator 53. The output of discriminator 53 is a voltage as indicated in FIG. 1 whose amplitude is proportional to frequency and is substantially independent of the input signal amplitude.

Figure 3:
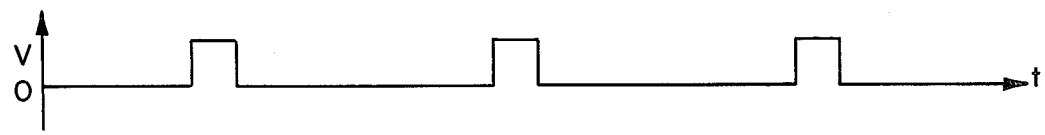
Figure 7:
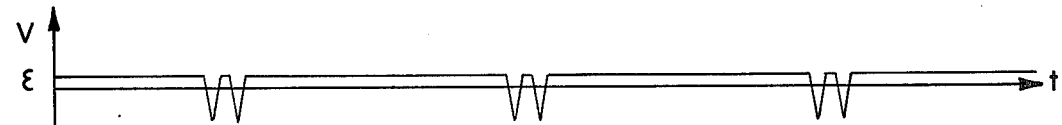

The output of discriminator 53 is then supplied to a low pass filter 54 to remove noise modulation components. The filtered signal is supplied to a conventional gate interrupt and hold circuit 55. At this point, the voltage-time character of the signal supplied to circuit 55 is as is shown in FIG. 7. Two negative-going voltage spikes appear in the signal as a result of the intermediate frequency dips that occur in the wave form in FIG. 6 when the slopes of the waves of FIG. 5 change direction. The conventional gate interrupt and hold circuit 55 serves to eliminate offset errors which would otherwise be produced by the presence of the dual voltage spikes. Elimination of the undesired signal is accomplished by driving a gate in circuit 55 with a pulse signal synchronized with the original triangular sweep from generator 57. As shown with respect to FIGS. 2 and 3, the gating pulses of FIG. 3 are produced at the times of the positive and negative maxima of the triangular wave of FIG. 2 simply by supplying the output of sweep generator 57 via lead 65 to an appropriate threshold detector 60. The pulses of FIG. 3 are produced because threshold circuit 60 senses the peaks and valleys of the triangles, and its output on lead 66 is thereby automatically adjusted for any change in the modulation frequency. The relationship of the time of the gate with respect to the intermediate frequency signal is preadjusted so that the gate 55 can not pass the output of discriminator 53 during the interval in which the intermediate frequency dips occur in FIG. 6. Instead, the voltage level at the input to gate 55 is sampled and held during the gate interval.

Figure 8:
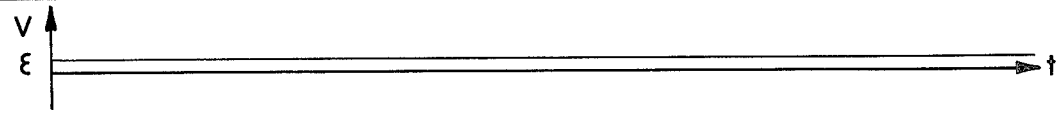

After filtering by low pass filter 56, the output of circuit 55 on lead 67 is an error voltage shown in FIG. 8. The voltage on lead 67 is supplied to a conventional voltage level detector 62. When the level is of sufficient amplitude, detector 62 is caused to render switch 63 conductive. In this instance, the filtered signal appearing on lead 67 is supplied also to sum circuit 61 for passage through switch 63. Sum circuit 61 may also be supplied with a reference frequency-determining voltage at terminal 70 from a power supply (not shown). Any signal passing through switch 63 is integrated by a conventional integrator 59 before supply to sum circuit 58 thence to operate the voltage controlled sweep generator 57. A bias signal for starting search operation may also be supplied at the will of the operator to sum circuit 58 by a power supply (not shown) coupled to the sum circuit terminal 71. Thus, the filtered output of gate circuit 55 fed to level detector 62 is used to activate the frequency control loop and is also the data signal which is integrated and is fed back to determine the frequency of the voltage-controlled sweep generator 57.

It is observed that switch 63 has two possible states; a locked position at 63b and a search state at 63a. In order to initiate operation of the loop, the modulation frequency of the output of generator 57 is started at a frequency predetermined to be lower than the frequency required to produce a beat frequency in the band pass filter 50 even at the longest target range. A unidirectional voltage applied to terminal 63a produces, in integrator 59, a ramp voltage that increases the modulation frequency of generator 57 until there is a beat frequency with a received signal within the band of intermediate frequency pre-amplifier 20. The reference unidirectional voltage supplied to terminal 71 when summed with the output of integrator 59 in sum circuit 58 determines the starting modulation frequency. The presence of the appropriate intermediate frequency is detected by discriminator 53 and when the gated and filtered output of circuits 55 and 56 exceeds the threshold of level detector 62, the loop control switch 63 is caused to conduct and the loop is closed. In essence, this event switches the input of integrator 59 from primary control by the voltage applied to switch element 63a to the gated and filtered discriminator output, thus locking the frequency control loop. Should range to the target being illuminated be decreased, a positive voltage is produced by discriminator 53 which will increase the modulation frequency, driving the output of discriminator 53 back to zero. In a similar manner, the reverse process occurs if target range increases. A conventional meter or other display 75 may be used to respond to the integrated output of integrator 59 for indicating range to the illuminated target.

In the active mode of operation of the invention, the frequency deviation of the transmitted signal is normally made large, typically extending from 34.5–35.5 GHz., for example. The relatively broad band width of the high frequency section of the system tends desirably to smooth target and background noise, ensuring highest target detection probability. Normally, the beat frequency generated in mixer 7 has a relatively narrow spectrum width, typically 50MHz., this signal being removed from the wide band intermediate frequency amplifier 20 through the relatively narrow band pass filter 50 and fed into frequency discriminator 53. The latter generates a voltage proportional to the beat frequency which is processed by integrator 59 and is fed to the voltage controlled sweep generator 57, thus closing the loop. The control loop functions as a servo, operating so that as target range closes, the beat frequency output of mixer 7 is maintained constant by increasing the modulation frequency supplied to oscillator 12.

In one type of operation, range is measured to the surface of the earth and when the sensor output reaches a particular range value, the system is commanded to begin active mode search for a target. The basic sensor may thus operate as a target seeker to acquire and lock onto a selected target. In such operation, the active mode function is continued through acquisition and range lock on until the sensor comes within the range capability permitting passive mode operation. At that time, the modulation control loop is opened and oscillator 12 is operated at a constant frequency, supplying only a local oscillator output of 35 GHz., for example. Received energy is then fed from mixer 7 to the utilization device 31 normally operating in the passive mode of the system.

The ranging technique of the present invention is a solution to two problems, providing several significant benefits. First, in the applications referred to in the foregoing and in other applications of the invention, a range output is obtained from the dual mode radiometric system which can be used automatically or manually to start operation in the acquisition mode of the system at an appropriate range. Secondly, the range output as at terminal 76 may be used automatically or otherwise to transfer the radiometer apparatus into its passive mode of operation at a desired range.

A major significant advantage of the novel ranging technique, in addition to providing range data, is that it also significantly reduces the effective receiver noise band width in the active mode of the system, typically from 500 to 50 MHz., without reducing the band width of the high frequency section of the radiometer. This desirable result is accomplished by always holding the beat frequency output of mixer 7 at a constant frequency value so that it passed readily through the narrow band intermediate frequency filter 50. In the typical example, there results a ten to one improvement in power measuring sensitivity at the output of detector 51 and, accordingly, a 30 per cent improvement in acquisition and range tracking performance. Accordingly, the invention not only converts the dual mode capability of the radiometer into a multi-mode capability, but also provides significant improvement in active mode sensor range performance without sacrifice of the important wide high-frequency band width of the sensor. In addition, the use of this invention in a radiometric system such as that of the Lazarchik et al. patent affords maximum additional use of radiometer components already available in the system, making no significant changes in the prior radio frequency and intermediate frequency transmitter and receiver circuits.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. In a high frequency radiometric system having directive antenna and radiometer receiver means,
   voltage controlled high frequency oscillator means,
   isolator means for coupling a first portion of the oscillation energy from said voltage controlled high frequency oscillator means for illumination of a target by said directive antenna means,
   coupler means for coupling a second portion of the oscillation energy from said voltage controlled high frequency oscillator means to said radiometer receiver means for generating therein a beat frequency signal in the presence of said illuminated target,
   radiometer switch means for cyclically and alternately coupling said beat frequency signal or a first reference noise signal to envelope detector means,
   phase detector means responsive to said envelope detector means in synchronous relation with the operation of said radiometer switch means,
   radiometer utilization means responsive to said phase detector means,
   frequency discriminator means responsive to said beat frequency signal for generating a control signal upon departure of said beat frequency from a predetermined frequency value, and
   control circuit means responsive to said control signal by readjusting said voltage controlled high frequency oscillator means so that the departure of said beat frequency signal from said predetermined value is corrected.

2. Apparatus as described in claim 1 wherein said frequency discriminator means comprises:
   limiter means responsive to the output of said radiometer switch means, discriminator circuit means responsive to said limiter means, and low pass filter means responsive to said discriminator circuit means.

3. Apparatus as described in claim 2 further including:

integrator means responsive to said low pass filter means, and target range responsive means responsive to said integrator means.

4. Apparatus as described in claim 3 further including:

voltage controlled sweep wave generator means additionally responsive to said integrator means, and summation circuit means for summing the output of said voltage controlled sweep wave generator means and a second reference noise signal for application to said voltage controlled oscillator means for controlling the frequency of oscillation thereof.

5. Apparatus as described in claim 3 further including voltage level detector means responsive to said low pass filter means for coupling the output of said low pass filter means to said integrator means only when said output of said low pass filter means exceeds a predetermined value.

6. Apparatus as described in claim 3 further including means for biasing the output of said integrator means.

7. Apparatus as described in claim 6 further including means for biasing the output of said low pass filter means.

8. Apparatus as described in claim 4 further including gating means connected in series relation between said discriminator means and said low pass filter means.

9. Apparatus as described in claim 8 further including peak detector threshold means responsive to said voltage controlled sweep generator means for detecting the presence of the substantially extremum values of said voltage controlled sweep wave generator output for synchronously rendering said gate non-conducting.

10. Apparatus as described in claim 9 wherein said gating means comprises sample and hold gate circuit means.

* * * * *